US012427776B2

(12) United States Patent
Osakabe et al.

(10) Patent No.: US 12,427,776 B2
(45) Date of Patent: Sep. 30, 2025

(54) LIQUID SUPPLYING APPARATUS

(71) Applicant: BROTHER KOGYO KABUSHIKI KAISHA, Nagoya (JP)

(72) Inventors: Yoshinori Osakabe, Seto (JP); Taichi Shirono, Nagoya (JP); Fumio Nakazawa, Okazaki (JP); Sosuke Kuroyanagi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/533,888

(22) Filed: Dec. 8, 2023

(65) Prior Publication Data

US 2024/0100844 A1 Mar. 28, 2024

Related U.S. Application Data

(62) Division of application No. 17/488,553, filed on Sep. 29, 2021, now Pat. No. 11,878,533.

(30) Foreign Application Priority Data

Sep. 30, 2020 (JP) ................................ 2020-164751

(51) Int. Cl.
*B41J 2/175* (2006.01)

(52) U.S. Cl.
CPC ....... *B41J 2/17513* (2013.01); *B41J 2/17523* (2013.01); *B41J 2/17556* (2013.01)

(58) Field of Classification Search
CPC ......................... B41J 2/17513; B41J 2/17523; B41J 2/17556; B41J 2/17509; B41J 29/02; B41J 29/13

(Continued)

(56) References Cited

U.S. PATENT DOCUMENTS 6,095,643 A 8/2000 Cook et al.
6,168,266 B1 1/2001 Ishinaga et al.

(Continued)

FOREIGN PATENT DOCUMENTS

CN 1157218 A 8/1997
CN 1334197 A 2/2002

(Continued)

OTHER PUBLICATIONS

First Office Action dated Jul. 24, 2024 received in Chinese Patent Application No. CN 202180066238.2.

(Continued)

*Primary Examiner* — Jason S Uhlenhake
*Assistant Examiner* — Alexander D Shenderov
(74) *Attorney, Agent, or Firm* — Scully, Scott, Murphy & Presser, P.C.

(57) ABSTRACT

A liquid supplying apparatus having a tank with a hole, a reservoir chamber to store a portion of liquid in the tank, and a flow path to store another portion of the liquid in the tank, is provided. The flow path connects the reservoir chamber and the hole. The flow path has a first funnel section to reduce a cross-sectional area of a part of the flow path. The first funnel section is located at a position equal to or higher than a surface of a predetermined maximum amount of the liquid storable in the tank in a usable posture. The first funnel section creates a meniscus with the liquid stored in the tank in an X1-rotated posture, in which the tank is rotated about a first axis by a first angle from the usable posture.

4 Claims, 12 Drawing Sheets

(58) Field of Classification Search
USPC .................................................... 347/86
See application file for complete search history.

(56) References Cited

U.S. PATENT DOCUMENTS

| | | | |
|---|---|---|---|
| 6,250,749 B1 | 6/2001 | Merz et al. | |
| 2002/0158948 A1 | 10/2002 | Miyazawa et al. | |
| 2013/0250012 A1* | 9/2013 | Larrobis, Jr. | B41J 2/175 347/85 |
| 2015/0306881 A1 | 10/2015 | Larrobis et al. | |
| 2016/0279957 A1 | 9/2016 | Kudo et al. | |
| 2017/0120609 A1 | 5/2017 | Kimura et al. | |
| 2017/0246879 A1 | 8/2017 | Kudo et al. | |
| 2017/0282572 A1 | 10/2017 | Osakabe et al. | |
| 2018/0244056 A1 | 8/2018 | Kudo et al. | |
| 2018/0281431 A1 | 10/2018 | Osakabe | |
| 2019/0232668 A1 | 8/2019 | Suzuki et al. | |

FOREIGN PATENT DOCUMENTS

| | | | |
|---|---|---|---|
| CN | 107128074 | A | 9/2017 |
| CN | 107323094 | A | 11/2017 |
| CN | 107428170 | A | 12/2017 |
| CN | 109328140 | A | 2/2019 |
| CN | 110193995 | A | 9/2019 |
| CN | 111421960 | A | 7/2020 |
| JP | 2016-168721 | A | 9/2016 |
| JP | 2016-168728 | A | 9/2016 |
| JP | 2016182731 | A | 10/2016 |
| JP | 2018-171874 | A | 11/2018 |
| KR | 100234501 | B1 | 3/2000 |

OTHER PUBLICATIONS

Notice of Reasons for Refusal dated Feb. 20, 2024 received in Japanese Patent Application No. JP 2020-164751.
Notice of Reasons for Refusal dated Jul. 23, 2024 received in Japanese Patent Application No. 2020-164751.
International Search Report and Written Opinion dated Dec. 7, 2021 from related PCT/JP2021/035117.
International Search Report and Written Opinion dated Dec. 7, 2021 from related PCT/JP2021/035101.
Office Action dated May 11, 2023 received in U.S. Appl. No. 17/488,553.
Notice of Allowance dated Sep. 8, 2023 received in U.S. Appl. No. 17/488,553.

* cited by examiner

LIQUID SUPPLYING APPARATUS

REFERENCE TO RELATED APPLICATIONS

This application is a divisional application of U.S. Ser. No. 17/488,553, filed on Sep. 29, 2021 and claims priority under 35 U.S.C. § 119 from Japanese Patent Application No. 2020-164751, filed on Sep. 30, 2020, the entire subject matter of which is incorporated herein by reference.

BACKGROUND ART

Technical Field

The present disclosure relates to a liquid supplying apparatus having a reservoir chamber to store liquid and a hole for communication with outside.

Related Art

Conventionally, an image recording apparatus with a tank having a large-capacity reservoir chamber for storing ink is known. The tank may have an injection port, through which the ink may be injected into the reservoir chamber from the outside, and a cap for closing or opening the injection port. The image recording apparatus may have a cover, which is openable/closable to a housing of the image recording apparatus, to cover or expose the cap. When the cover is open, the cap may be removed from the injection port of the tank, and the ink may be injected through the injection port into the reservoir chamber of the tank.

SUMMARY

In order to equalize an air pressure in the reservoir chamber to the atmosphere pressure outside the tank, the reservoir chamber in the tank may be open through a hole to the outside. Therefore, when the image recording apparatus, with the reservoir chamber in the tank storing the ink, is moved, tilted, or rotated, the ink in the tank may leak outside through the hole. As a result, an interior of the image recording apparatus may be smeared with the ink.

The present disclosure is advantageous in that a liquid supplying apparatus, in which flowing out of liquid from a reservoir chamber through a hole to the outside may be difficult, is provided.

According to an aspect of the present disclosure, a liquid supplying apparatus, having a tank, a reservoir chamber, and a flow path, is provided. The tank is configured to store liquid and has a hole open to outside of the tank. The reservoir chamber is arranged in the tank and is configured to store a portion of the liquid in the tank. The flow path is arranged in the tank and is configured to store another portion of the liquid in the tank. The flow path connects the reservoir chamber and the hole. The flow path has a first funnel section to reduce a cross-sectional area of a part of the flow path. The first funnel section is located at a position equal to or higher than a surface of a predetermined maximum amount of the liquid storable in the tank being in a usable posture, in which the liquid is suppliable externally from the tank. The first funnel section is configured to create a meniscus with the liquid stored in the tank being in an X1-rotated posture, in which the tank is rotated about a first axis extending along a horizontal direction by a first angle from the usable posture.

According to another aspect of the present disclosure, a liquid supplying apparatus, having a tank, a reservoir chamber, and a flow path, is provided. The tank is configured to store liquid and has a wall, in which a hole open to outside of the tank is formed. The reservoir chamber is arranged in the tank and is configured to store a portion of the liquid in the tank. The flow path is arranged in the tank and is configured to store another portion of the liquid in the tank. The flow path connects the reservoir chamber and the hole. In the tank being in a rotated posture, in which the tank is rotated about an axis extending along a horizontal direction by an angle from a usable posture, in which the liquid is suppliable externally from the tank, the reservoir chamber is configured to create an air layer with a predetermined maximum amount of the liquid storable in the tank. The air layer is enclosed by a surface of the liquid stored in the tank and walls delimiting the reservoir chamber. The walls delimiting the reservoir chamber are different from the wall having the hole therein. A surface of the liquid in the flow path is maintained at a level equal to or lower than a surface of the liquid in the reservoir chamber by a negative pressure produced by the air layer.

According to another aspect of the present disclosure, a liquid supplying apparatus, having a tank, a reservoir chamber, and a flow path, is provided. The tank is configured to store liquid and has a hole open to outside of the tank. The reservoir chamber is arranged in the tank and is configured to store a portion of the liquid in the tank. The flow path is arranged in the tank and is configured to store another portion of the liquid in the tank. The flow path connects the reservoir chamber and the hole. The flow path is delimited at least by a first wall and a second wall. In the tank being in a rotated posture, in which the tank is rotated about an axis extending along a horizontal direction by an angle from a usable posture, in which the liquid is suppliable externally from the tank, one of the first wall and the second wall is located above the other of the first wall and the second wall, and the one of the first wall and the second wall extends in one of a direction along the horizontal direction and a direction slanting to be lower along an orientation of a flow toward the reservoir chamber.

DESCRIPTION

In the following paragraphs, with reference to the accompanying drawings, an embodiment of the present disclosure will be described. It is noted that various connections may be set forth between elements in the following description. These connections in general and, unless specified otherwise, may be direct or indirect and this specification is not intended to be limiting in this respect.

Figure 1:
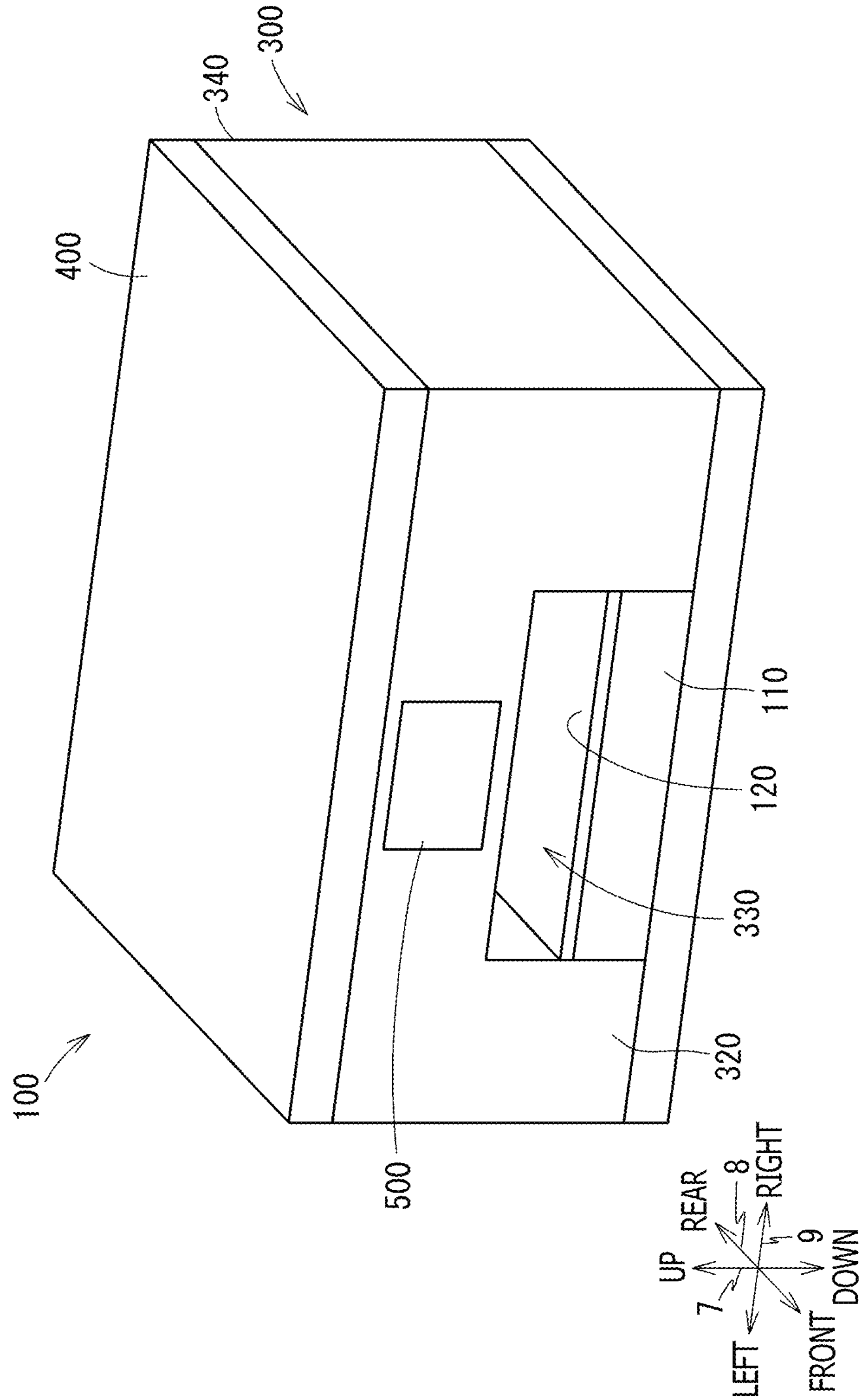
FIG. 1 is a perspective view of a printer 100 according to an embodiment of the present disclosure.

In the following description, directivity indicated by a pointing arrow, from a root of a stem toward a pointing head, will be expressed by a term "orientation," whereas back or forth movability along a line extending through a stem and a pointing head of an arrow will be expressed by a term "direction." Moreover, positional relation within the printer 100 and each part or item included in the printer 100 will be mentioned on basis of a posture of the printer 100 in an ordinarily usable condition as indicated by the bi-directionally pointing arrows in FIG. 1. For example, a vertical axis between an upper side and a lower side in FIG. 1 is defined as an up-down direction 7. A side, on which an opening 330 is formed, is defined as a front face 320, and an axis between the front side and a rear side opposite from the front side is defined as a front-rear direction 8. A right-hand side and a left-hand side to a user who faces the front face 320 of the printer 100 are defined as a rightward side and a leftward side, respectively. An axis between the rightward side and the leftward side is defined as a right-left direction 9. The up-down direction 7, the front-rear direction 8, and the right-left direction 9 intersect orthogonally to one another. When the printer 100 is set in the ordinarily usable condition, the up-down direction 7 coincides with a vertical direction. In the following description, the up-down direction 7 and the right-left direction 9 may be referred to as a vertical direction 7 and a widthwise direction 9, respectively.

[Overall Configuration of Printer 100]

The printer 100 as shown in FIG. 1 may record a monochrome image in a single color, e.g., black, on a sheet M (see FIG. 2) in an inkjet recording method. The sheet M may be, for example, a sheet of paper or an OHP film. It may be noted, however, that the method to record the image on the sheet M may not necessarily be limited to inkjet recording but may be in a different recording method such as, for example, thermal-inkjet recording, which is also known as bubblejet (registered trademark) recording.

The printer 100 has a housing 300, a cover 400, and a user interface (UI) 500.

[Hosing 300]

Figure 2:
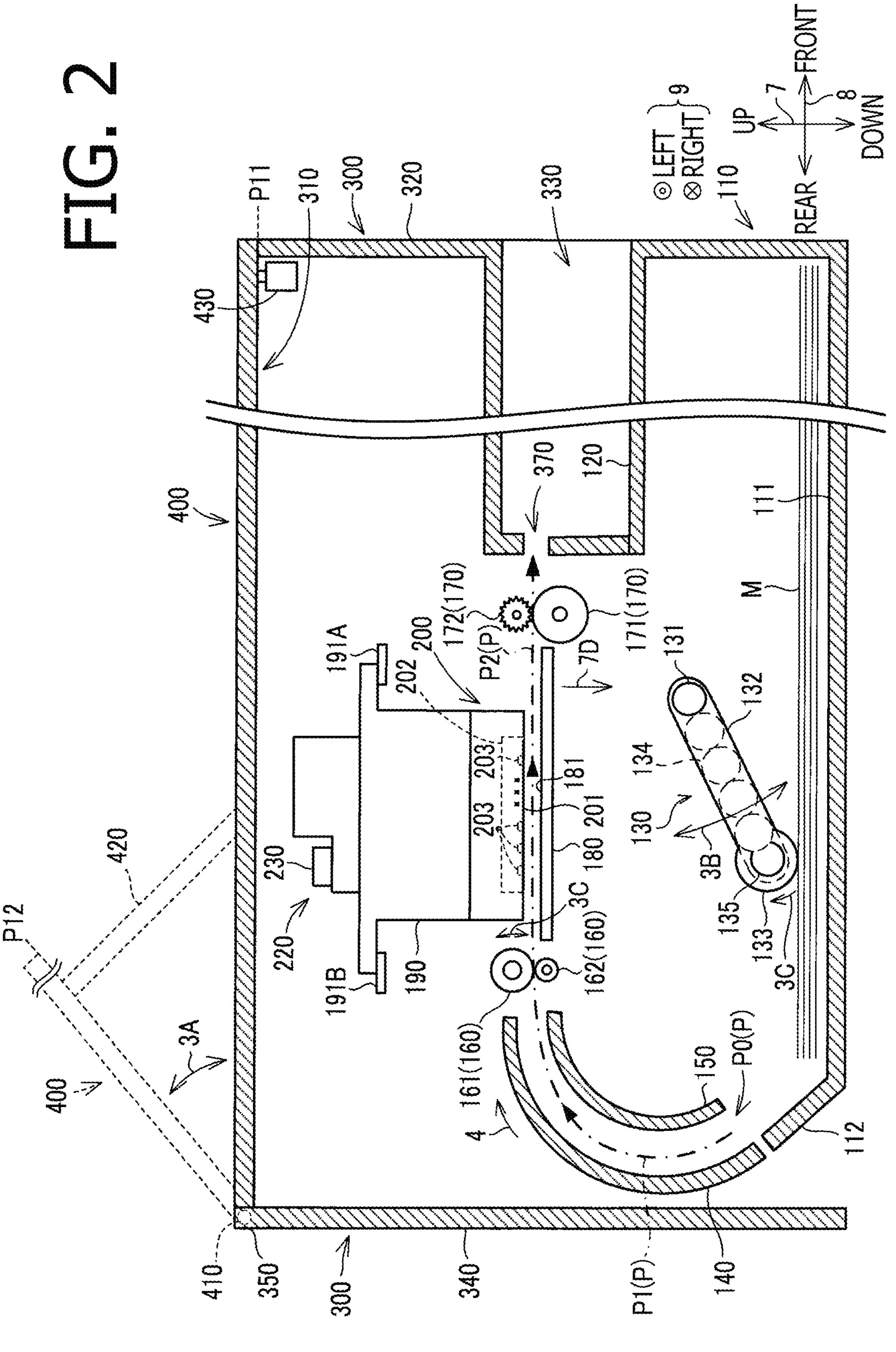
FIG. 2 is a vertically cross-sectioned view to illustrate an inner structure of the printer 100 according to the embodiment of the present disclosure.

The housing 300 may have a shape of an approximately rectangular cuboid. As shown in FIG. 2, the hosing 300 has an opening 310 at an upper end thereof. In other words, the housing 300 is open upward at the upper end thereof. The opening 310 may be closed by the cover 400. The cover 400 is pivotable about an axis 410, which is located at an upper end of a rear face 340 of the housing 300. As shown in FIG. 1, on the front face 320 of the housing 300, the UI 500 is arranged. The UI 500 may include a display and operation buttons, which may be operated by a user.

[Internal Configuration of Printer 100]

As shown in FIG. 2, the printer 100 has a feeder tray 110, an ejection tray 120, a feeder 130, an outer guide 140, an inner guide 150, a conveyer roller pair 160, an ejection roller pair 170, a platen 180, a carriage 190, a head 200, a conveyer 210, and a tank 220, which are accommodated in the housing 300.

[Feeder Tray 110]

As shown in FIG. 1, the feeder tray 110 may be inserted in the housing 300 through the opening 330. As shown in FIG. 2, on a bottom 111 of the feeder tray 110, one or more sheets M may be stacked in the vertical direction 7. From a rear end of the bottom 111, a guide member 112 extends upper-rearward, and the extended end of the guide member 112 is located below a lower end of the outer guide 140.

[Ejection Tray 120]

In the housing 300, at a position above the feeder tray 110, a sheet outlet 370 is formed. Through the sheet outlet 370, the sheet M, on which an image is recorded through a liquid-discharging action by the printer 100, may be ejected. The sheet M with the image recorded thereon may be called as a printed material M. The ejection tray 120 is arranged at a lower-frontward position with respect to the sheet outlet 370. The ejection tray 120 may support the printed material M.

[Feeder 130] The feeder 130 includes a shaft 131, a feeder arm 132, a feeder roller 133, and a driving-force transmission assembly 134.

The shaft 131 is supported by a frame, which is not shown, and extends in the widthwise direction 9 at a position above the bottom 111. The feeder arm 132 is supported by the shaft 131 at a basal end part thereof. The feeder arm 132 is pivotable in a circumferential direction 3B of an axis of the shaft 131. The feeder arm 132 extends lower-rearward from the basal end part. The feeder roller 133 is attached to a tip end part of the feeder arm 132. The feeder roller 133 is rotatable in a circumferential direction 3C of a shaft 135, which is parallel to the shaft 131. The driving-force transmission assembly 134 may include a gear train and a driving belt and may be arranged inside the feeder arm 132.

The feeder roller 133 may contact an uppermost one of the sheets M stacked on the bottom 111 of the feeder tray 110. The driving-force transmission assembly 134 may transmit a force generated by a motor, which is not shown, to the feeder roller 133. The feeder roller 133 may be rotated by the transmitted force and apply a rearward conveying force to the uppermost sheet M. Thereby, the uppermost sheet M may be conveyed rearward on the bottom 111 and guided by an inclined surface of the guide member 112 to a conveyer path P through a sheet inlet P0.

[Conveyer Path P]

As shown in FIG. 2, inside the housing 300, the conveyer path P to convey the sheet M is formed. The sheet inlet P0 forms an upstream end of the conveyer path P and is located immediately above the extended end of the guide member 112. The conveyer path P is a so-called U-turn path and includes a curved path P1 and a linear path P2. The curved path P1 is delimited by the outer guide 140 and the inner guide 150 and curves substantially upper-frontward from the sheet inlet P0. The linear path P2 extends substantially linearly frontward from a downstream end of the curved path P1 to the sheet outlet 370.

[Conveyer Roller Pair 160]

As shown in FIG. 2, the conveyer roller pair 160 includes a driving roller 161 and a pinch roller 162. The driving roller 161 and the pinch roller 162 are arranged to contact each other in the vertical direction 7 across a downstream end part of the curved path P1 and extend in the widthwise direction 9 along the downstream end part of the curved path P1.

The driving roller 161 may rotate by the force generated in a motor, which is not shown. The pinch roller 162 may be rotated by the rotation of the driving roller 161. The driving roller 161 and the pinch roller 162 may nip the sheet M and rotate to convey the sheet M in a conveying orientation 4, e.g., frontward. Thereby, the sheet M may be conveyed downstream in the linear path P1.

[Ejection Roller Pair 170]

As shown in FIG. 2, the ejection roller pair 170 includes a driving roller 171 and a spur roller 172. The driving roller 171 and the spur roller 172 are arranged to contact each other in the vertical direction 7 between the platen 180 and the sheet outlet 370 in the linear path P2 across the linear path P2 and extend in the widthwise direction 9 along the linear path P2.

The driving roller 171 may rotate by the force generated in the motor, which is not shown. The spur roller 172 may be rotated by the rotation of the driving roller 171. The driving roller 171 and the spur roller 172 may nip the sheet M and rotate to convey the sheet M further downstream in the conveying orientation 4. Thereby, the sheet M may be ejected outside through the sheet outlet 370.

[Platen 180]

The platen 180 is located between the conveyer roller pair 160 and the ejection roller pair 170 in the front-rear direction 8. The platen 180 has a supporting surface 181 spreading in the front-rear direction 8 and the widthwise direction 9. The supporting surface 181 delimits a lowermost part of the linear path P2 and may support the sheet M from below. The supporting surface 181 may be formed of upper-end faces of a plurality of ribs protruding upward from the platen 180 and longitudinally extending in the front-rear direction 8. Optionally, however, the supporting surface 181 may be a plain upper surface of the platen 180.

[Carriage 190]

Figure 3:
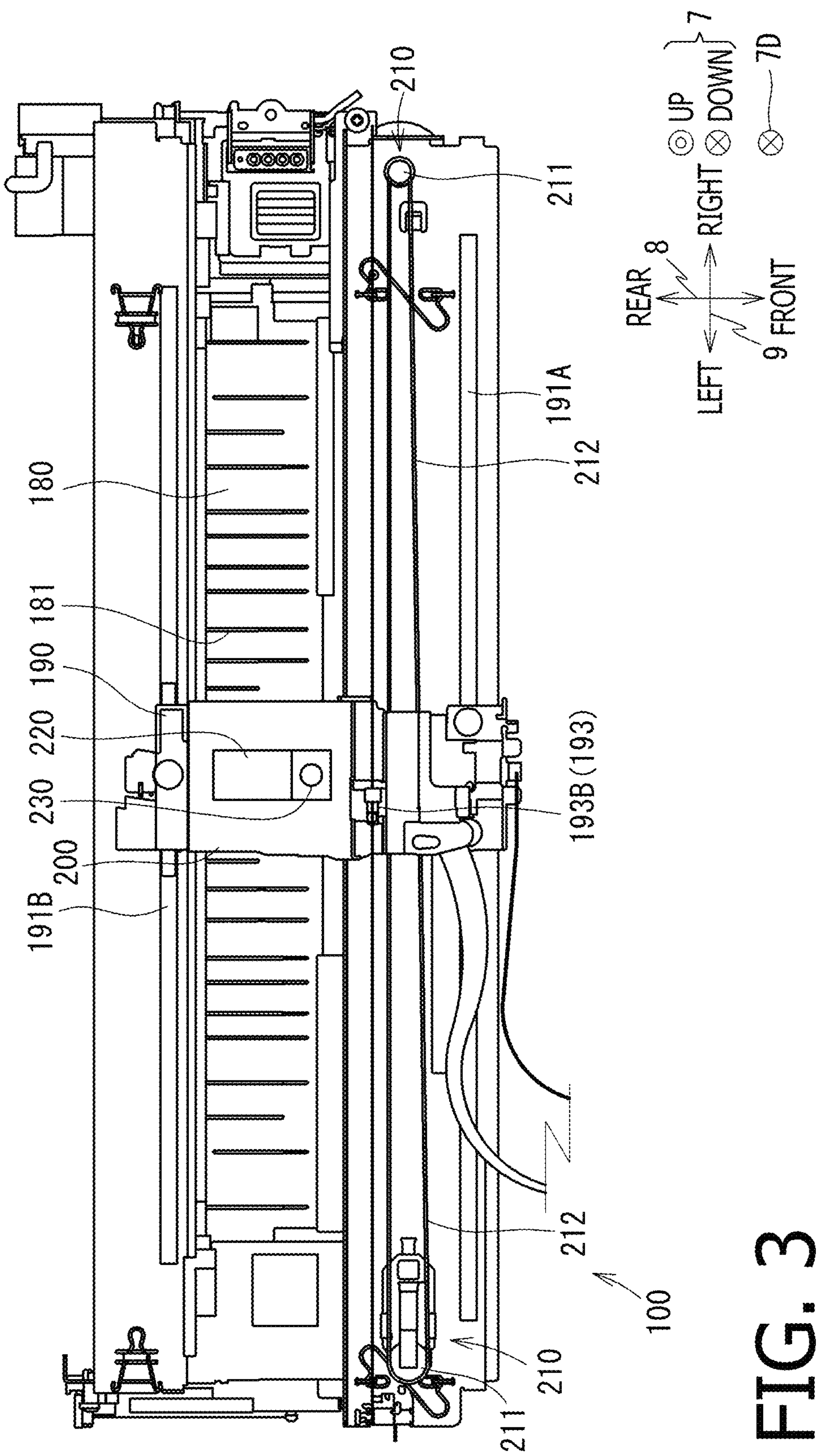
FIG. 3 is a plan view showing an arrangement of a platen 180, a carriage 190, and a tank 220 in the printer 100 according to the embodiment of the present disclosure.

The printer 100 further has guide rails 191A, 191B arranged inside the housing 300. As shown in FIG. 2, the guide rails 191A, 191B are located at positions higher than the supporting surface 181 and are supported by a frame, which is not shown. As shown in FIG. 3, in a top plan view, the guide rails 191A, 191B are arranged to be spaced apart in the front-rear direction 8 and longitudinally extend in the widthwise direction 9. Between the guide rails 191A, 191B in the front-rear direction 8, the supporting surface 181 of the platen 180 is located.

As shown in FIG. 3, the carriage 190 is located between the guide rails 191A, 191B and is supported by the guide rails 191A, 191B. The carriage 190 may move on the guide rails 191A, 191B by the force transmitted through the conveyer 210 to reciprocate in the widthwise direction 9.

[Conveyer 210]

As shown in FIG. 3, the conveyer 210 includes two (2) pulleys 211 and an endless belt 212. The pulleys 211 are separated on the guide rail 191A from each other in the widthwise direction 9. Each pulley 211 may rotate in a circumferential direction of an axis thereof, which extends along the vertical direction 7. The endless belt 212 is strained around the pulleys 212 and is coupled to the carriage 190. One of the pulleys 212 on the right may rotate by the force generated in a motor, which is not shown. Therefore, the head 200 coupled to the endless belt 212 may reciprocate in the widthwise direction 9 between the pulleys 211.

[Head 200]

As shown in FIG. 2, the head 200 is mounted on the carriage 190. A plurality of nozzles 203 are formed to align along the front-rear direction 8 on a lower face 201 of the head 200. The lower face 201 of the head 200 faces downward toward the supporting surface 181 of the platen 180. The head 200 accommodates piezoelectric devices (not shown), which correspond to the nozzles 203 on one-to-one basis. Driving waveforms modulated to each of the piezoelectric devices may be applied to the piezoelectric devices, and thereby the head 200 may discharge the ink and consume the ink stored therein through the nozzles 203 in a discharging orientation 7D, i.e., downward.

The head 200 may move above the supporting surface 181 of the platen 180 while the carriage 190 moves for a pass in one way, i.e., leftward or rightward. The head 200 moving along with the carriage 190 may discharge ink through the nozzles 203 to record a line of image for the pass on the sheet M.

[Tank 220]

As shown in FIG. 3, the tank 220 is mounted along with the head 200 on the carriage 190. The tank 220 is located at a position higher than the head 200 and is connected to the head 200 so that the tank 220 may not be detached from the head 200 easily. The tank 220 may be a so-called on-carriage tank attachable to the housing 300 by being mounted on the carriage 190.

Figure 4:
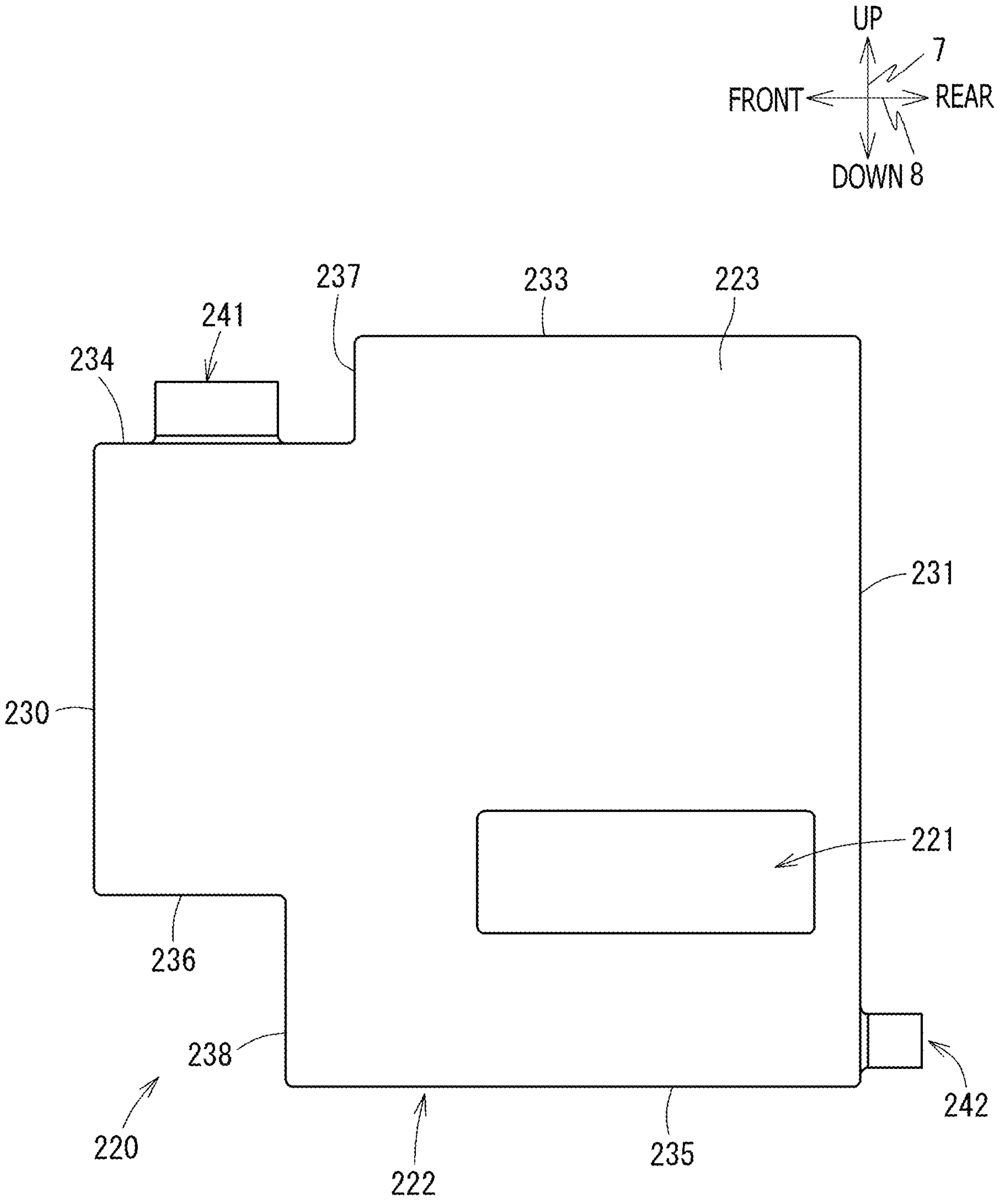
FIG. 4 is a rightward side view of the tank 220 in a usable posture according to the embodiment of the present disclosure.

The tank 220 may store the ink therein. A color of the ink may be, for example, black. As shown in FIG. 4, the ink in the tank 220 may flow through an outflow port 242 and may be supplied to the head 200.

As shown in FIG. 4, the tank 220 has a shape of an approximately rectangular cuboid. At a position substantially lower than a center of the tank 220 in the vertical direction 7, a through hole 221 is formed through the tank 220 in the widthwise direction 9. A shape of the through hole 221 is not limited. Moreover, an upper corner and a lower corner on a front side of the tank 220 are dented inward to form steps, but shapes of the dents are not limited.

Figure 6:
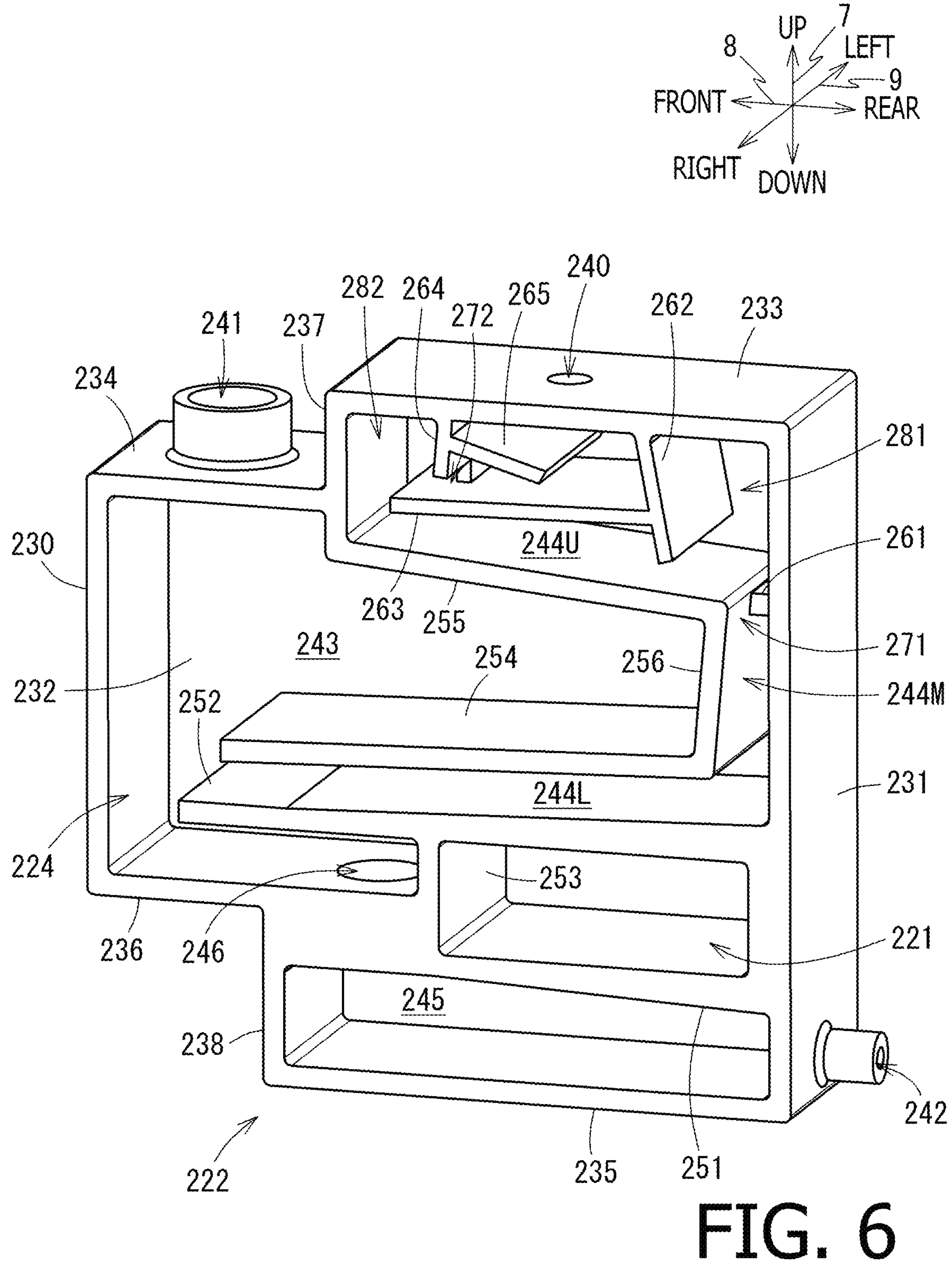
FIG. 6 is a perspective view of the body 222 of the tank 220 in the usable posture according to the embodiment of the present disclosure.

The tank 220 includes a body 222 and a sheet 223. As shown in FIG. 6, the body 222 has a form of a container, which is open rightward at an opening 224. As shown in FIG. 4, the sheet 223 closes the opening 224 of the body 222. The body 222 and the sheet 223 may be made of, for example, synthetic resin. The sheet 223 may be welded or bonded to edges of the opening 224 of the body 222 to seal the opening 224 liquid-tightly.

Figure 5:
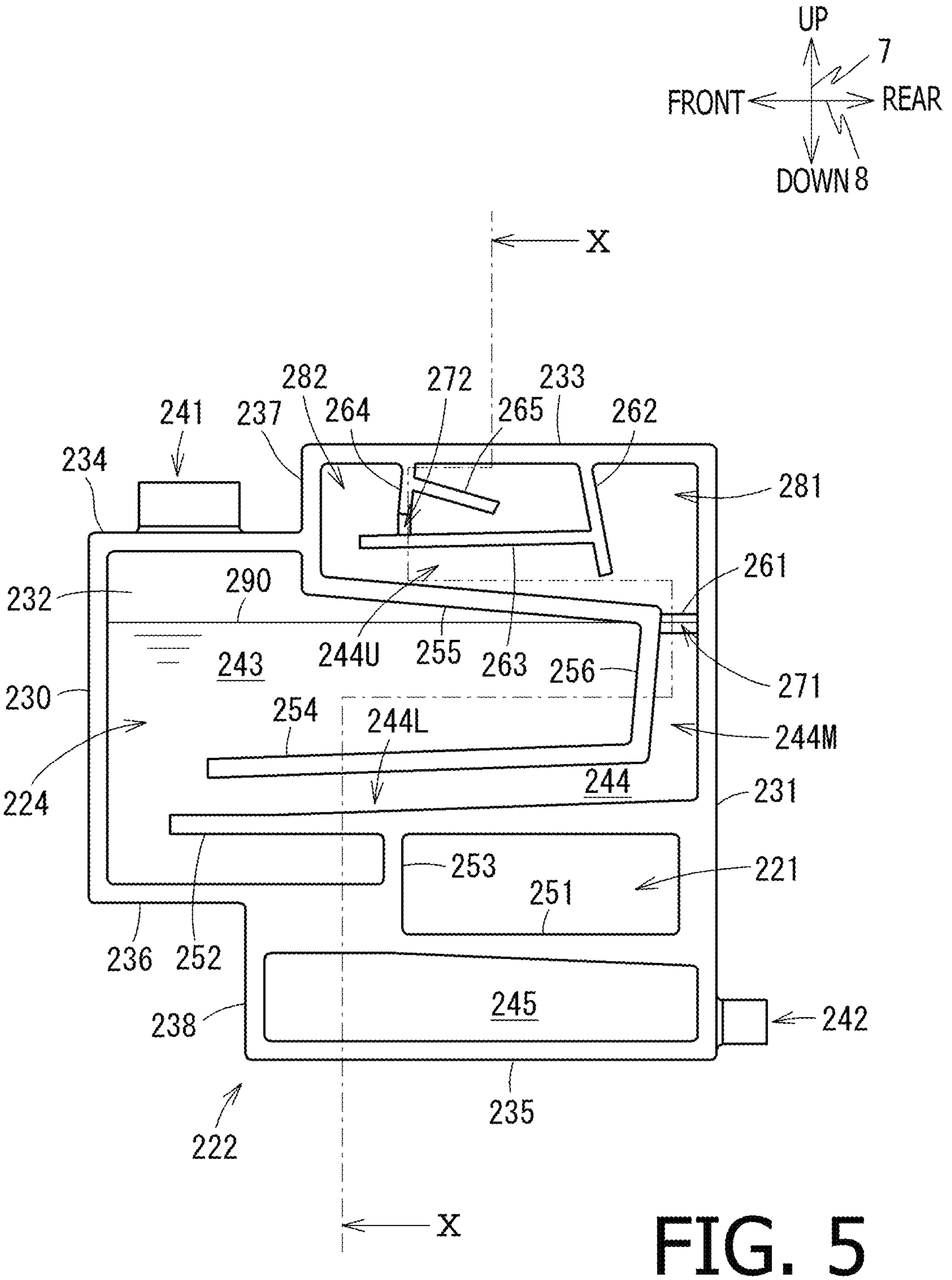
FIG. 5 is a rightward side view of a body 222 of the tank 220 in the usable posture according to the embodiment of the present disclosure.
Figure 7:
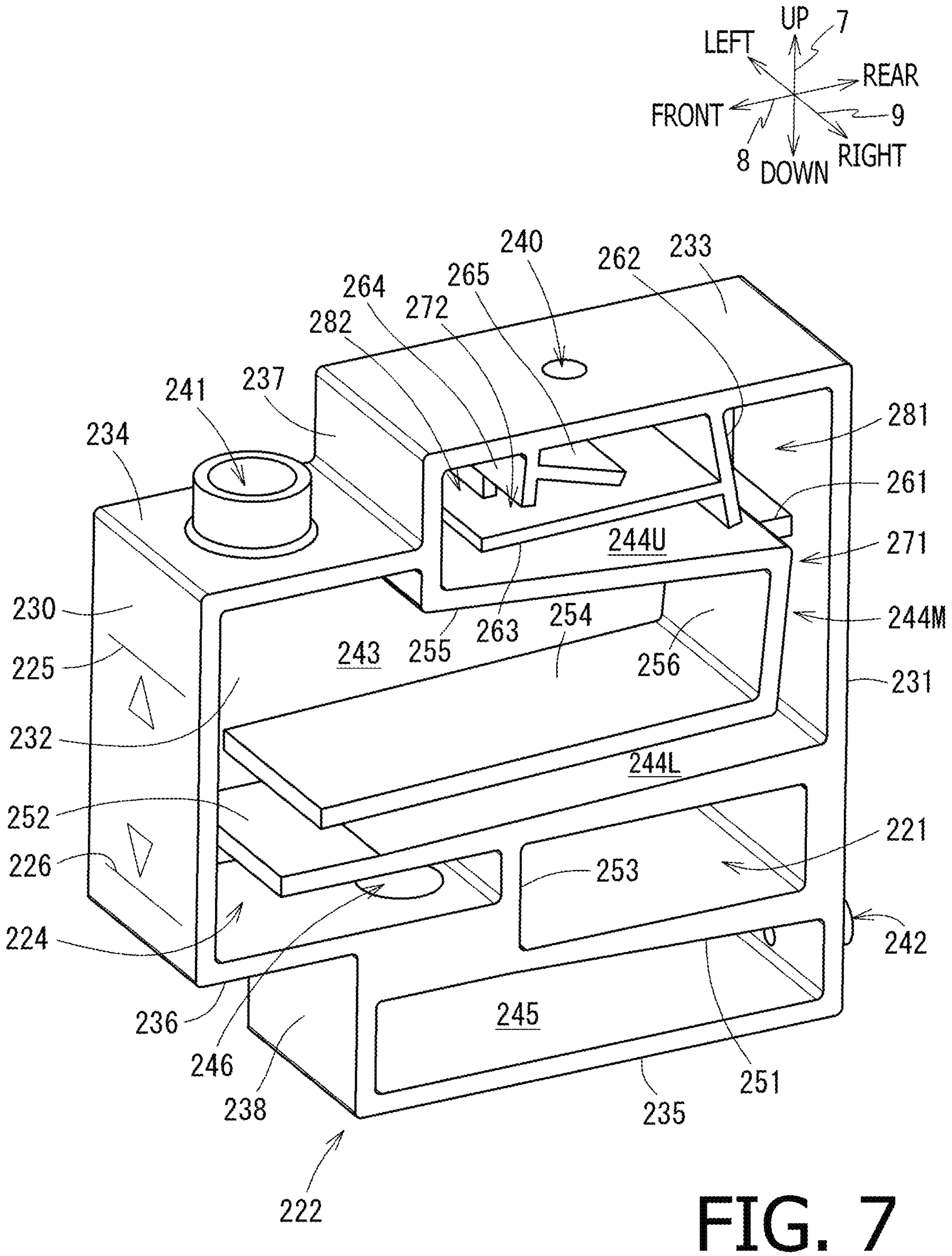
FIG. 7 is another perspective view of the body 222 of the tank 220 in the usable posture according to the embodiment of the present disclosure.

As shown in FIGS. 5-7, the body 222 has a front wall 230, a rear wall 231, a left-side wall 232, an upper wall 233, a sub-upper wall 234, a lower wall 235, and a sub-lower wall 236. The front wall 230 and the rear wall 231 are separated in the front-rear direction 8. The upper wall 233 and the sub-supper wall 234 are separated in the vertical direction 7, and the lower wall 235 and the sub-lower wall 236 are separated in the vertical direction 7. The left-side wall 232 is separated from the sheet 223 in the widthwise direction 9.

An upper end of the front wall 230 is continuous with a front end of the upper wall 234. A lower end of the front wall 230 is continuous with a front end of the sub-lower wall 236. An upper end of the rear wall 231 is continuous with a rear end of the upper wall 233. A lower end of the rear wall 231 is continuous with a rear end of the lower wall 235. Leftward ends of the front wall 230, the rear wall 231, the upper wall 233, the sub-upper wall 234, the lower wall 235, and the sub-lower wall 236 are continuous with the left-side wall 232.

The upper wall 233 and the sub-upper wall 234 are separated in the vertical direction 7 and in the front-rear direction 8. A front end of the front wall 230 and a rear end of the sub-upper wall 234 are connected by an upper-step wall 237. A lower end of the upper-step wall 237 is located to be lower than the sub-upper wall 234. The lower wall 235 and the sub-lower wall 236 are separated in the vertical direction 7 and in the front-rear direction 8. A front end of the lower wall 235 and a rear end of the sub-lower wall 236 are connected by a lower-step wall 238. Leftward ends of the upper-step wall 237 and the lower-step wall 238 are continuous with the left-side wall 232.

In the upper wall 233, an air communication hole 240 is formed. The air communication hole 240 is formed through the upper-wall 233 in the vertical direction 7. The air communication hole 240 connects a flow path 244 in the tank 220 with the atmosphere outside the tank 220. In other words, the flow path 244 in the tank 220 and the atmosphere outside the tank 220 communicate through the air communication hole 240. The air communication hole 240 is open at all time. Therefore, a reservoir chamber 243 is open to the outside atmosphere through the air communication hole 240 and the flow path 244.

In the sub-upper wall 234, an injection port 241 is formed. The injection port 241 is formed through the sub-upper wall 234 in the vertical direction 7. The injection port 241 may connect the reservoir chamber 243 in the tank 220 with the outside of the tank 220. The ink may be injected into the reservoir chamber 243 through the injection port 241. The injection port 241 may be, although not shown in the drawings, sealed by, for example, a rubber plug or a cap.

In the rear wall 231, at a lower position close to the lower end of the rear wall 231, the outflow port 242 is formed. The outflow port 242 is formed through the rear wall 231 in the front-rear direction 8. The outflow port 242 connects a sub-reservoir chamber 245 in the tank 220 with the outside of the tank 220. The ink stored in the sub-reservoir chamber 245 may flow outward through the outflow port 242. Although not shown in the drawings, the outflow port 242 may be connected with the head 200 through a flow path, which may be formed of, for example, a tube or a flow path member made of resin, so that the ink may flow through the flow path to reach the head 200.

The body 222 of the tank 220 may be formed mainly of a translucent material, e.g., transparent resin. Therefore, a user may visually recognize a surface level of the ink stored in the tank 220. As shown in FIG. 7, on the front wall 230, an upper index 225 and a lower index 226 are marked. The upper index 225 may be a line and a triangular sign indicating a surface level of the ink when a maximum storable amount of ink is stored in the tank 220. The lower index 226 may be a line and a triangular sign indicating a surface level of the ink when an amount of the ink stored in the tank 220 is low, and the tank 220 should be refilled with the ink.

[Inner Structure of Tank 220]

As shown in FIGS. 5-7, inside the tank 220, the reservoir chamber 243, the flow path 244, and the sub-reservoir chamber 245 are formed. The ink may be stored in and flow through the reservoir chamber 243, the flow path 244, and the sub-reservoir chamber 245. The reservoir chamber 243, the flow path 244, and the sub-reservoir chamber 245 are delimited by divider walls 251-256, which will be described further below, in an inner space in the tank 220 delimited by the body 222 and the sheet 223. The reservoir chamber 243 and the flow path 244 are continuous to allow the ink to flow there-between, and the reservoir chamber 243 and the sub-reservoir chamber 245 are continuous to allow the ink to flow there-between. The flow path 244 is continuous with the reservoir chamber 243 and the air communication hole 240. In other words, the reservoir chamber 243, the flow path 244, and the sub-reservoir chamber 245 are not spaces independent from one another but are partitioned to be partly continuous with one another.

As shown in FIGS. 5-7, between the lower-step wall 238 and the rear wall 231, a first divider wall 251 extends along the front-rear direction 8. A front end of the first divider wall 251 is continuous with an upper end of the lower-step wall 238. A rear end of the first divider wall 251 is continuous with the rear wall 231. A leftward end of the first divider wall 251 is continuous with the left-side wall 232. To a rightward end of the first divider wall 251, the sheet 223 is attached. A frontward part of the first divider wall 251 delimits the reservoir chamber 243 and the sub-reservoir chamber 245. A rearward part of the first divider wall 251 delimits the sub-reservoir chamber 245 and the through hole 221. In the frontward part of the first divider wall 251, a hole 246 is formed through in the vertical direction 7. Through the hole 246, the ink and the air may flow between the reservoir chamber 243 and the sub-reservoir chamber 245.

As shown in FIGS. 5-7, between the front wall 230 and the rear wall 231, a second divider wall 252 extends along the front-rear direction 8. The second divider wall 252 is located to be spaced apart above from the first divider wall 251. An upper face of a rearward part of the second divider wall 252 slants rearward to be gradually higher. A front end of the second divider wall 252 is separated from the front wall 230 in the front-rear direction 8. A rear end of the second divider wall 252 is continuous with the rear wall 231. A leftward end of the second divider wall 252 is continuous with the left-side wall 232. To a rightward end of the second divider wall 252, the sheet 223 is attached. The second divider wall 252 delimits a part of the flow path 244. A frontward part of the second divider wall 252 faces the sub-lower wall 236. The frontward part of the second divider wall 252 and the sub-lower wall 236 form a space continued from the reservoir chamber 243 to the hole 246.

As shown in FIGS. 5-7, between the first divider wall 251 and the second divider wall 252, a third divider wall 253 extends along the vertical direction 7. The third divider wall 253 is located rearward with respect to the hole 246. An upper end of the third divider wall 253 is continuous with the second divider wall 252. A lower end of the third divider wall 253 is continuous with the first divider wall 251. A leftward end of the third divider wall 253 is continuous with the left-side wall 232. To a rightward end of the third divider wall 253, the sheet 223 is attached. The third divider wall 253 delimits the space continuous from the reservoir chamber 243 to the hole 246 and the through hole 221.

As shown in FIGS. 5-7, between the front wall 230 and the rear wall 231, a fourth divider wall 254 extends along the front-rear direction 8. The fourth divider wall 254 is located to be spaced apart above from the second divider wall 252. The fourth divider wall 254 slants rearward to be gradually higher. A front end of the fourth divider wall 254 is separated from the front wall 230 in the front-rear direction 8. A rear end of the fourth divider wall 254 is separated from the rear wall 231 in the front-rear direction 8. A leftward end of the fourth divider wall 254 is continuous with the left-side wall 232. To a rightward end of the fourth divider wall 254, the sheet 223 is attached. The fourth divider wall 254 delimits a part of the flow path 244. The front end of the fourth divider wall 254 is located substantially rearward with respect to the front end of the second divider wall 252. The second divider wall 252 and the fourth divider wall 254 delimit a lower flow path 244L, which forms a part of the flow path 244. The lower flow path 244L is a flow path extending rearward from a lower-frontward area in the reservoir chamber 243. The fourth divider wall 254 delimits the lower flow path 244L and the reservoir chamber 243.

As shown in FIGS. 5-7, between the upper-step wall 237 and the rear wall 231, a fifth divider wall 255 extends along the front-rear direction 8. The fifth divider wall 255 is located to be spaced apart above from the fourth divider wall 254. The fifth divider wall 255 slants rearward to be gradually lower. A front end of the fifth divider wall 255 is continuous with the lower end of the upper-step wall 237. A rear end of the fifth divider wall 255 is separated from the rear wall 231 in the front-rear direction 8. A leftward end of the fifth divider wall 255 is continuous with the left-side wall 232. To a rightward end of the fifth divider wall 255, the sheet 223 is attached. The fifth divider wall 255 delimits a part of the flow path 244. The fifth divider wall 255, the upper wall 233, and the upper-step wall 237 delimit an upper flow path 244U, which forms another part of the flow path 244. The upper flow path 244U is a flow path located above the reservoir chamber 243 and is continuous with the air-communication hole 240. The fifth divider wall 255 and the upper-step wall 237 delimit the upper flow path 244U and the reservoir chamber 243.

As shown in FIGS. 5-7, between the fourth divider wall 254 and the fifth divider wall 255, a sixth divider wall 256 extends along the vertical direction 7. The sixth divider wall 256 slants gradually rearward as the sixth divider wall 256 extends upward. In other words, as the sixth divider wall 256 extends upward, a distance between the sixth divider wall 256 and the rear wall 231 is reduced. An upper end of the sixth divider wall 256 is continuous with the rear end of the fifth divider wall 255. A lower end of the sixth divider wall 256 is continuous with the rear end of the fourth divider wall 254. A leftward end of the sixth divider wall 256 is continuous with the left-side wall 232. To a rightward end of the sixth divider wall 256, the sheet 223 is attached. The sixth divider wall 256 delimits a part of the flow path 244. The sixth divider wall 256 and a part of the rear wall 231 delimit a vertical flow path 244M, which forms another part of the flow path 244. The vertical flow path 244M is a flow path connecting the lower flow path 244L and the upper flow path 244U. The sixth divider wall 256 delimits the vertical flow path 244M and the reservoir chamber 243.

As shown in FIGS. 5-7, between the sixth divider wall 256 and the rear wall 231, a first partition wall 261 extends along the front-rear direction 8. The first partition wall 261 is located in an upper area in the vertical flow path 244M. A front end of the first partition wall 261 is continuous with the sixth divider wall 256. A rear end of the first partition wall 261 is continuous with the rear wall 231. A leftward end of the first partition wall 261 is continuous with the left-side wall 232. A rightward end of the first partition wall 261 is located leftward with respect to the rightward end of the sixth divider wall 256 and the rightward end of the rear wall 231. The sheet 223 is not attached to the rightward end of the first partition wall 261. Therefore, a gap is created between the rightward end of the first partition wall 261 and the sheet 223. This gap forms a first funnel section 271. The first funnel section 271 is delimited by the first partition wall 261, the sixth divider wall 256, the rear wall 231, and the sheet 223. The first funnel section 271 occupies a part of the vertical flow path 244M, and a cross-sectional area of the first funnel section 271 along the front-rear direction 8 and the widthwise direction 9 is smaller than a cross-sectional area of the vertical flow path 244M, except at the part of the vertical flow path 244M where the first funnel section 271 occupies, along the front-rear direction 8 and the widthwise direction 9.

As shown in FIGS. 5-7, between the fifth divider wall 255 and the upper wall 233, a second partition wall 262 extends along the vertical direction 7. The second partition wall 262 is located in a rearward area in the upper flow path 244U at a position rearward with respect to the air communication hole 240. The second partition wall 262 slants rearward as the second partition wall 262 extends downward. An upper end of the second partition wall 262 is continuous with the upper wall 233. A lower end of the second partition wall 262 is separated from the fifth divider wall 255 in the vertical direction 7. A leftward end of the second partition wall 262 is continuous with the left-side wall 232. To a rightward end of the second partition wall 262, the sheet 223 is attached. A space delimited by the second partition wall 262, the rear wall 231, and the upper wall 233 forms a first buffer chamber 281.

As shown in FIGS. 5-7, between the second partition wall 262 and the upper-step wall 237, a third partition wall 263 extends along the front-rear direction 8. The third partition wall 263 is located at a position lower than the upper wall 233 and higher than the fifth divider wall 255. The third partition wall 263 slants to be lower as the third partition wall 263 extends frontward. A rear end of the third partition wall 263 is continuous with the second partition wall 262. A front end of the third partition wall 263 is separated from the upper-step wall 237 in the front-rear direction 8. A leftward end of the third partition wall 262 is continuous with the left-side wall 232. To a rightward end of the third partition wall 261, the sheet 223 is attached. The third partition wall 263 and the fifth divider wall 255 form a flow path continuing frontward from the first buffer chamber 281.

As shown in FIGS. 5-7, between the third partition wall 263 and the upper wall 233, a fourth partition wall 264 extends along the vertical direction 7. The fourth partition wall 264 is located in a frontward area in the upper flow path 244U at a frontward position with respect to the air communication hole 240. The fourth partition wall 264 slants frontward as the fourth partition wall 264 extends downward. An upper end of the fourth partition wall 264 is continuous with the upper wall 233. A lower end of the fourth partition wall 264 is partly continuous with the third partition wall 263. A leftward end of the fourth partition wall 264 is continuous with the left-side wall 232. To a rightward end of the fourth partition wall 264, the sheet 223 is attached. A lower-right end of the fourth partition wall 264 is cut off to form a second funnel section 272. The second funnel section 272 is located between the first funnel section 271 and the air communication hole 240 in the flow path 244.

The second funnel section 272 is delimited by the third partition wall 263, the fourth partition wall 264, and the sheet 223. The second funnel section 272 occupies a part of the upper flow path 244U, and a cross-sectional area of the second funnel section 272 along the vertical direction 7 and the widthwise direction 9 is smaller than a cross-sectional area of the upper flow path 244U, except at the part of the upper flow path 244U where the second funnel section 272 occupies, along the vertical direction 7 and the widthwise direction 9. A space delimited by the fourth partition wall 264, the third wall 263, and the upper step wall 237 forms a second buffer chamber 282.

As shown in FIGS. 5-7, between the second partition wall 262 and the fourth partition wall 264, a fifth partition wall 265 extends along the front-rear direction 8. The fifth partition wall 265 is located at a position lower than the upper wall 233 and higher than the third partition wall 263. The fifth partition wall 265 slants to be lower as the fifth partition wall 265 extends rearward. A front end of the fifth partition wall 265 is continuous with the fourth partition wall 264. The front end of the fifth partition wall 265 is located to be higher than the second funnel section 272. A rear end of the fifth partition wall 265 is separated from the second partition wall 262 in the front-rear direction 8. The rear end of the fifth partition wall 265 is located rearward with respect to the air communication hole 240. A leftward end of the fifth partition wall 265 is continuous with the left-side wall 232. To a rightward end of the fifth partition wall 265, the sheet 223 is attached. A flow path continued rearward from the second buffer chamber 282 is formed by the fifth partition wall 263 and the third partition wall 263.

[Rotation of Tank 220]

FIG. 5 illustrates the body 222 of the tank 220 in the usable posture storing the maximum storable amount of ink. In this condition, the surface of the ink is at the position of the upper index 225. The ink may be loaded in the tank 220 for, for example, testing operations of the printer 100. After the test, the printer 100 may be moved to another location, and while being moved, the printer 100 may be rotated from the usable posture. Accordingly, the tank 220 may be rotated. In the following paragraphs, behaviors of the ink when the tank 220 is rotated will be described.

As shown in FIG. 5, when the tank 220 is in the usable posture and stores the maximum storable amount of ink, the ink is in the reservoir chamber 243, the flow path 244, and the sub-reservoir chamber 245. In the reservoir chamber 243, the ink stays in a lower area, and the air stays in an upper area.

The ink may be injected into the tank 220 through the injection port 241. While the ink is being injected, the air in the reservoir chamber 243 may flow out through the injection port 241. When the surface of the ink in the reservoir chamber 243 reaches the upper index 225, injection of the ink ends, and the injection port 241 may be sealed by, for example, a rubber plug. Therefore, the reservoir chamber 243 is not open to the outside atmosphere.

The ink entering the reservoir chamber 243 may flow through the hole 246 into the sub-reservoir chamber 245. As the ink flows in the sub-reservoir chamber 245, the air in the sub-reservoir chamber 245 may flow into the reservoir chamber 243. Therefore, when the tank 220 stores the maximum storable amount of ink, the sub-reservoir chamber 245 is filled with the ink.

The ink entering the reservoir chamber 243 may also flow to the flow path 244. As the ink flows in the flow path 244, the air in the flow path 244 may flow outside the tank 220 through the air-communication hole 240. At the time when injection of the ink ends, the injection port 241 is open; therefore, both the reservoir chamber 243 and the flow path 244 are at the atmospheric pressure. Accordingly, the surface of the ink in the reservoir chamber 243 and the surface of the ink in the flow path 244 are at an equal level. When the tank 220 stores the maximum storable amount of ink, a surface 290 of the ink in the flow path 244, which is at the equal level to a surface 290 of the ink in the reservoir chamber 243, is substantially at a same position as the first funnel section 271.

Figure 8:
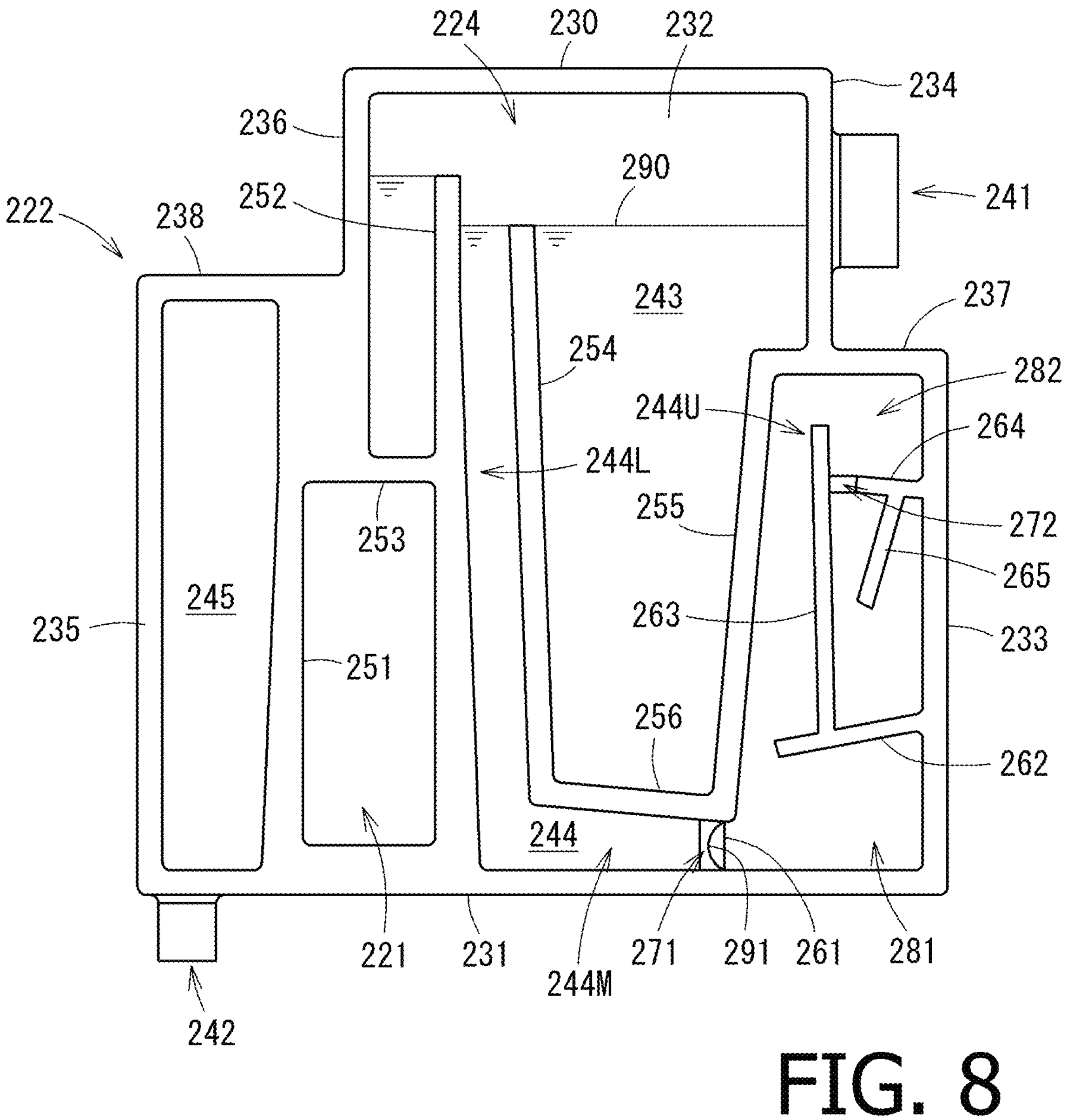
FIG. 8 is a rightward side view of the body 222 of the tank 220 in an X1-rotated posture according to the embodiment of the present disclosure.

FIG. 8 illustrates the tank 220 in an X1-rotated posture, in which the tank 220 is rotated about a rotation axis extending along the widthwise direction 9 clockwise by 90 degrees from the usable posture shown in FIG. 5. When the tank 220, storing the maximum storable amount of ink, is in the X1-rotated posture, the surface 290 of the ink in the reservoir chamber 243 is at a position substantially equal to the front end, or an upper end when the tank 220 is in the X1-rotated posture, of the fourth divider wall 254. The surface of the ink staying in the space continued from the reservoir chamber 243 to the hole 246 is at a level substantially equal to the front end, or an upper end when the tank 220 is in the X1-rotated posture, of the second divider wall 252. The surface 290 of the ink in the flow path 244 is at a substantially same level as the front end, or an upper end when the tank 220 is in the X1-rotated posture, of the fourth divider wall 254.

When the tank 220 is in the X1-rotated posture, the lower flow path 224L extends substantially vertically, and the vertical flow path 244M extends substantially horizontally. In the flow path 244, the upper flow path 244U is open to the outside atmosphere through the air communication hole 240; therefore, the ink in the vertical flow path 244M may tend to flow toward the upper flow path 244U by the own weight of the ink. However, the ink may form a meniscus 291 in the first funnel section 271, and due to an effect of surface tension of the meniscus 291, the ink may be restrained from flowing from the vertical flow path 244M to the upper flow path 244U. In other words, the first funnel section 271 may create the meniscus 291 with the ink when the amount of the ink in the tank 220 being in the X1-rotated posture is the maximum storable amount. Accordingly, the ink in the vertical flow path 244M or the lower flow path 244L may not be replaced with the air, and the surface 290 of the ink in the flow path 224 may stay at the level substantially equal to the front end of the fourth divider wall 254.

Figure 9:
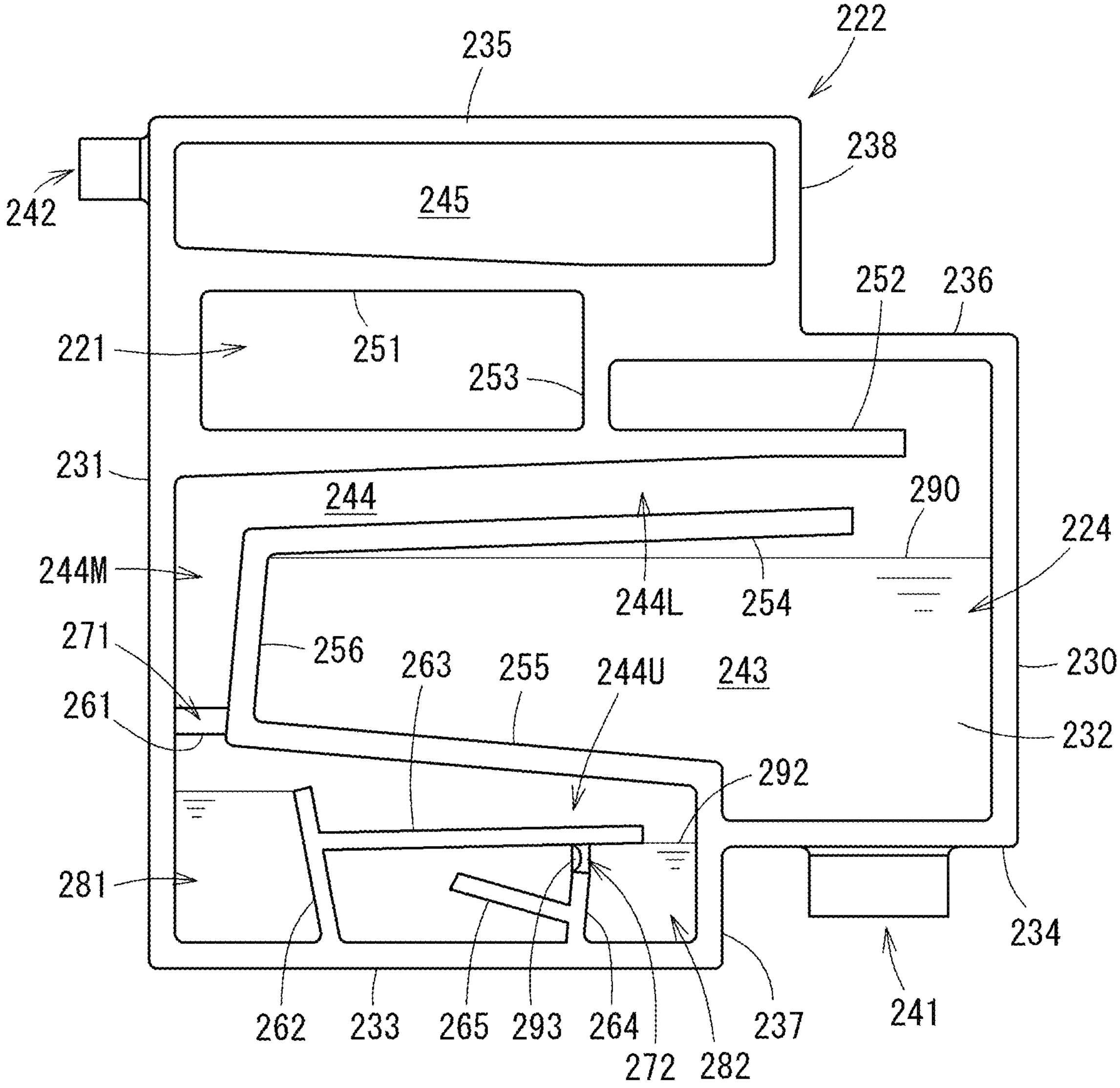
FIG. 9 is a rightward side view of the body 222 of the tank 220 in an X2-rotated posture according to the embodiment of the present disclosure.

FIG. 9 illustrates the tank 220 in an X2-rotated posture, in which the tank 220 is rotated about the rotation axis extending along the widthwise direction 9 clockwise by 90 degrees from the X1-rotated posture shown in FIG. 8, i.e., by 180 degrees from the usable posture. When the tank 220 is in the X2-rotated posture, the surface 290 of the ink in the reservoir chamber 243 is in proximity to the rear end, or a lower end when the tank 220 is in the X2-rotated posture, of the fourth divider wall 254. The ink stayed in the space continued from the reservoir chamber 243 to the hole 246 in the earlier posture flows downward to a position lower than the second divider wall 252.

In the flow path 244, the upper flow path 244U is open to the outside atmosphere through the air communication hole 240; therefore, the ink may tend to flow toward the upper flow path 244U by the own weight of the ink. Therefore, the meniscus 291 formed of the ink in the first funnel section 271 may collapse, and the ink may flow from the lower flow path 244L and the vertical flow path 244M to the upper flow path 244U. The ink flowing into the upper flow path 244U may be stored in the first buffer chamber 281. The ink overflowing from the first buffer chamber 281 may flow on the third partition wall 263 and may be stored in the second buffer chamber 282.

The upper flow path 244U is open to the outside atmosphere through the air communication hole 240. Therefore, when the surface of the ink in the second buffer chamber 282 rises to a level higher than the second funnel section 272, the ink may tend to flow from the second buffer chamber 282 toward the air communication hole 240. However, the ink may form a meniscus 293 in the second funnel section 272, and due to the effect of surface tension of the meniscus 293, the ink may be restrained from flowing from second buffer chamber 282 to the air communication hole 240. In other words, the second funnel section 272 may create the meniscus 293 with the ink when the amount of the ink in the tank 220 being in the X2-rotated posture is the maximum storable amount. Accordingly, the ink in the second buffer chamber 282 may not be replaced with the air, and the surface 292 of the ink in the flow path 224 may stay at the level substantially equal to the lower end, or an upper end when the tank 220 is in the X2-rotated posture, of the fourth partition wall 264. When the tank 220 is in the X2-rotated posture, moreover, an amount of the ink remaining in the vertical flow path 244M may be reduced, and the ink may form the meniscus 291 once again in the first funnel section 271.

Figure 10:
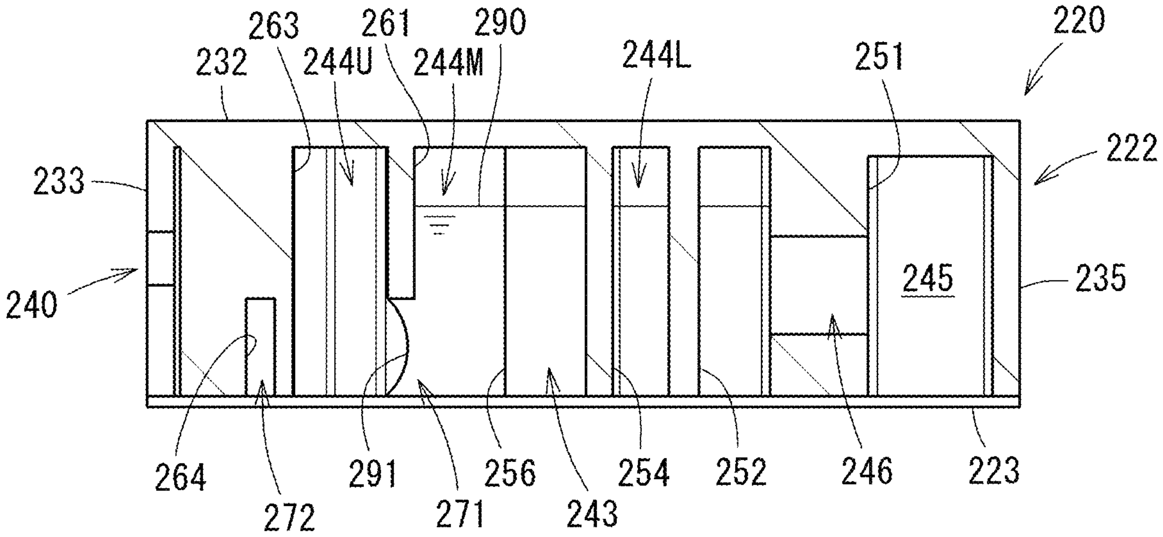
FIG. 10 is a cross-sectional view of the body 222 of the tank 220 in a Y1-rotated posture according to the embodiment of the present disclosure viewed at a section X-X shown in FIG. 5.

FIG. 10 illustrates the tank 220 in a Y1-rotated posture, in which the tank 220 is rotated about a rotation axis extending along the front-rear direction 8 clockwise, in a view from the front side, by 90 degrees from the usable posture shown in FIG. 5. In other words, the tank 220 is in a posture, rotated from the posture shown in FIG. 5 about the rotation axis extending along the front-rear direction 8, in which the upper wall 233 is closer to a viewer of FIG. 5 and the lower wall 235 is farther from the viewer.

When the tank 220 is in the Y1-rotated posture, the upper flow path 244U is open to the outside atmosphere through the air communication hole 240. Therefore, the ink may tend to flow toward the upper flow path 244U from the vertical flow path 244M by the own weight of the ink. However, the ink may form the meniscus 291 in the first funnel section 271, and due to the effect of surface tension of the meniscus 291, the ink may be restrained from flowing from the vertical flow path 244M to the upper flow path 244U. In other words, the first funnel section 271 may create the meniscus 291 with the ink when the amount of the ink in the tank 220 being in the Y1-rotated posture is the maximum storable amount. Accordingly, the ink in the vertical flow path 244M or the lower flow path 244L may not be replaced with the air, and the surface 290 of the ink in the flow path 224 and the surface 290 of the reservoir chamber 243 may stay at a level higher than the first funnel section 271.

When the tank 220 is in the Y1-rotated posture, if, for example, the meniscus 291 formed in the first funnel section 271 collapses, the ink may flow from the vertical flow path 244M to the upper flow path 244U. In such an event, however, the ink may form another meniscus in the second funnel section 272. Therefore, the ink may still be restrained from flowing from the second buffer chamber 282 toward the air communication hole 240. Moreover, when the tank 220 is in the Y1-rotated posture, the amount of the ink remaining in the vertical flow path 244M may be reduced. Therefore, the ink may once again form the meniscus 291 in the first funnel section 271.

[Benefits]

According to the embodiment described above, when the tank 220 is in the X1-rotated posture, the ink in the flow path 244 may be restrained from flowing toward the air communication hole 240 by the meniscus 291 formed in the first funnel section 271.

Moreover, when the tank 220 is in the X2-rotated posture, the ink in the flow path 244 may be restrained from flowing toward the air communication hole 240 by the meniscus 293 formed in the second funnel section 272.

Moreover, when the tank 220 is in the X2-rotated posture, the ink in the flow path 244 may be restrained from flowing toward the air communication hole 240 by the menisci 291, 293 formed in the first funnel section 271 and the second funnel section 272.

Furthermore, when the tank 220 is in the Y1-rotated posture, the ink in the flow path 244 may be restrained from flowing toward the air communication hole 240 by the meniscus 293 formed in the first funnel section 271 and/or the meniscus formed in the second funnel section 272.

Meanwhile, the tank 220 having the body 222 and the sheet 223 may be formed easily in a synthetic resin. In the embodiment described above, the body 222 is formed to have the opening 224 on the rightward side alone; however, the body 222 may have openings, each on the rightward side and the leftward side, and the sheet 223 may be attached to each of the rightward end and the leftward end of the body 222. If the body 222 has the openings on both rightward and leftward sides, the first funnel section 271 and the second funnel section 272 may be delimited by a different one of the sheets 223. In other words, the first funnel section 271 may be located on one side of the flow path 244 in the widthwise direction 9, and the second funnel section 272 may be located on the other side of the flow path 244 in the widthwise direction.

Furthermore, the upper flow path 244U has the first buffer chamber 281 and the second buffer chamber 282, which may store the ink therein. Therefore, when the tank 220 is in the X1-rotated posture or the X2-rotated posture, the ink may be prevented from flowing outward through the air communication hole 240.

Although an example of carrying out the invention has been described, those skilled in the art will appreciate that there are numerous variations and permutations of the liquid supplying apparatus that fall within the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters. Below will be described modified examples of the present embodiment.

First Modified Example

For example, in the embodiment described above, the first funnel section 271 is formed by the first partition wall 261, which is located in the vertical flow path 244M. However, the first partition wall 261 may not necessarily be provided, or the first funnel section 271 may not necessarily be formed in the vertical flow path 244.

Figure 11:
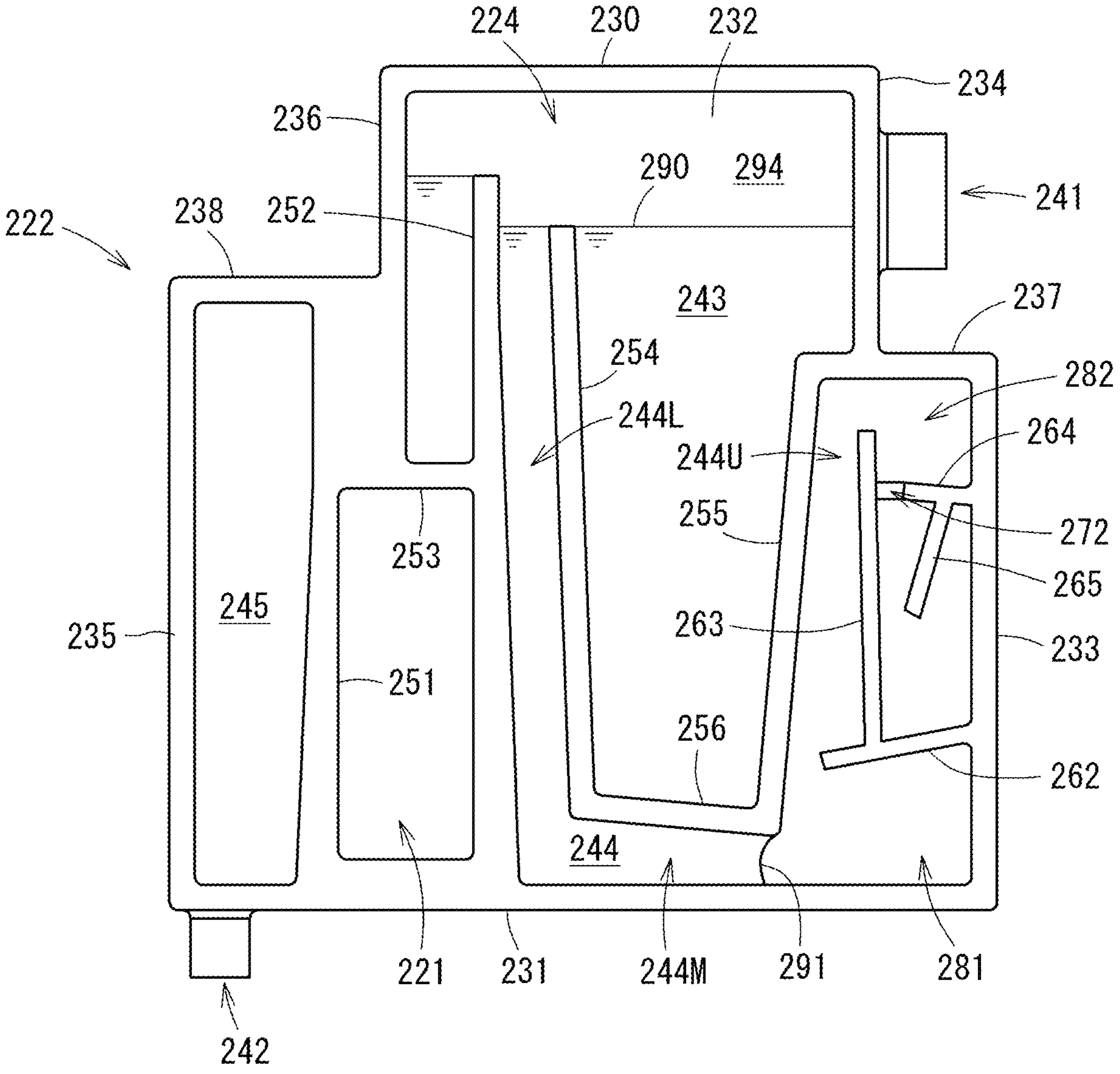
FIG. 11 is a rightward side view of the body 222 of the tank 220 in the X1-rotated posture according to a first modified example of the embodiment of the present disclosure.

As shown in FIG. 11, when the tank 220 is in the X1-rotated posture, an air layer 294 may be created in the reservoir chamber 243. The air layer 294 may be enclosed by the front wall 230, the sub-upper wall 234, the sub-lower wall 236, the left-side wall 232, the sheet 223, and the surface 290 of the ink. The air communication hole 240 is not formed in any of the front wall 230, the sub-upper wall 234, the sub-lower wall 236, the left-side wall 232, or the sheet 223. Meanwhile, the injection port 241 is sealed by a plug made of, for example, rubber. Therefore, the air layer 294 is not open to the atmosphere outside the tank 220.

Meanwhile, in the flow path 244, the upper flow path 244U is open to the outside atmosphere through the air communication hole 240. Therefore, the ink may tend to flow toward the upper flow path 244U by the own weight of the ink. However, due to a negative pressure produced by the air layer 294, the ink in the vertical flow path 244M or the lower flow path 244L may not be replaced with the air, and a meniscus 291 may be formed between the upper flow path 244U and the vertical flow path 244M. In other words, the flow path 244 may create the meniscus 291 with the ink at a position between the upper flow path 244U and the vertical flow path 244M when the amount of the ink in the tank 220 being in the X1-rotated posture is the maximum storable amount. Accordingly, the surface 290 of the ink in the flow path 244 may stay at the level substantially equal to the front end of the fourth divider wall 254.

Moreover, even if, for example, the ink flows into the upper flow path 244U, with the amount of the ink remaining in the vertical flow path 244M being reduced, the ink may be restrained from flowing by the negative pressure of the air layer 294. In this occasion, the surface 290 of the ink in the flow path 244 may be at a level lower than the front end of the fourth divider wall 254.

Second Modified Example

In the first modified example described above, the sixth divider wall 256 slants gradually upper-rearward, similarly to the sixth divider wall 256 in the embodiment described earlier. However, for another example, the sixth divider wall 256 may not necessarily slant gradually upper-rearward as illustrated in the first modified example. In other words, the sixth divider wall 256 may slant gradually upper-frontward. More specifically, a gap between the sixth divider wall 256 and the rear wall 231 may be gradually reduced in the front-rear direction 8 as the sixth divider wall 256 extends downward.

Figure 12:
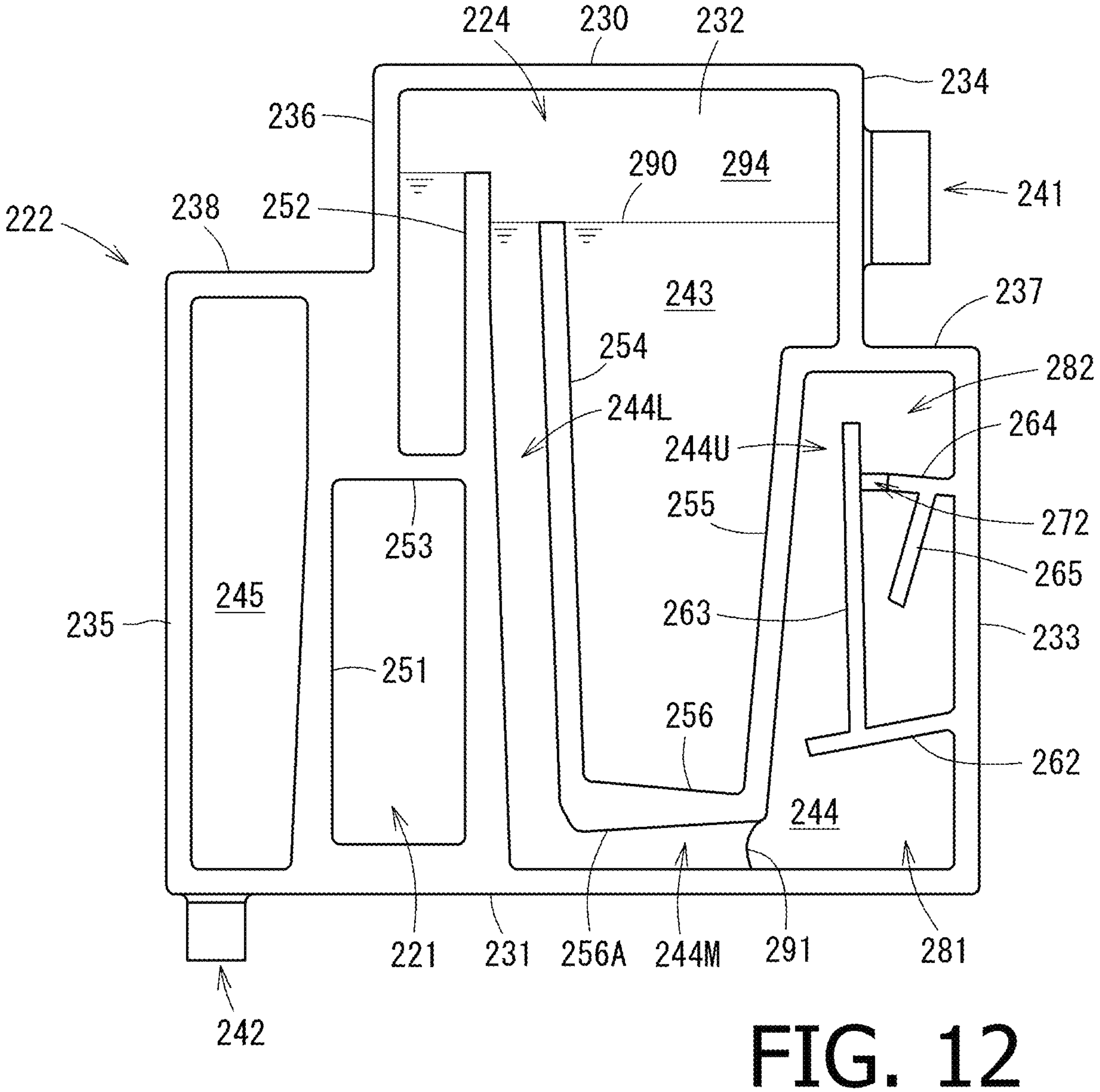
FIG. 12 is a rightward side view of the body 222 of the tank 220 in the X1-rotated posture according to a second modified example of the embodiment of the present disclosure.

As shown in FIG. 12, when the tank 220 is in the X1-rotated posture, a wall face 256A being a part of the sixth divider wall 256 delimiting the vertical flow path 244M may inline to be lower along an orientation of a flow toward the lower flow path 244L, in other words, in an orientation to flow toward the reservoir chamber 243, e.g., leftward in FIG. 12. Thus, even if the air may enter the vertical flow path 244M through the upper flow path 244U, the air may not easily flow along the wall face 256A of the sixth divider wall 256 and may be restrained from proceeding farther to the lower flow path 244L. Therefore, the ink in the vertical flow path 244M or the lower flow path 244L may not be replaced with the air, and the meniscus 291 may be formed between the upper flow path 244U and the vertical flow path 244M. In other words, the flow path 244 may create the meniscus 291 with the ink at a position between the upper flow path 244U and the vertical flow path 244M when the amount of the ink in the tank 220 being in the X1-rotated posture is the maximum storable amount. For another example, the wall face being a part of the sixth divider wall 256 delimiting the vertical flow path 244M may extend along the horizontal direction in the tank 220 being in the X1-rotated posture.

More Examples

For another example, when the tank 220 is in the X1-rotated posture, the vertical flow path 244M may not necessarily extend along the horizontal direction as long as the vertical flow path 244M extends in a direction including a horizontal component, in other words, as long as the vertical flow path 244M extends in a direction including a vertical component when the tank 220 is in the usable posture.

For another example, when the tank 220 is in the usable posture, and when the tank 220 stores the maximum storable amount of ink, the surface 290 of the ink may not necessarily be at the level substantially equal to the first funnel section 271 but may be at a level lower than the first funnel section 271.

For another example, the flow path 244 may not necessarily be a single flow path having the first funnel section 271 and the second funnel section 272 arranged serially. For example, two (2) flow paths 244 may be arranged in parallel between the reservoir chamber 243 and the air communication hole 240, and the first funnel section 271 may be arranged in one of the flow paths 244 while the second funnel section 272 may be arranged in the other of the flow paths 244.

For another example, the tank 220 may be removable from the head 200. For another example, the tank 220 may be dividable into two parts: one having the reservoir chamber 243 and the flow path 244, and the other having the sub-reservoir chamber 245; and the part having reservoir chamber 243 and the flow path 244 may be removable from the head 200 while the other part having the sub-reservoir chamber 245 may be immovably fixed to the head 200. For another example, the sub-reservoir chamber 245 may be omitted. In this arrangement, the reservoir chamber 243 and the head 200 may communicate through the hole 246 to allow the ink to flow through.

For another example, the opening, through which the ink may leak outside the tank 220 may not necessarily be limited to the air communication hole 240. For example, the injection port 241 may be the opening, through which the ink may leak.

For another example, the printer 100 may not necessarily be limited to the monochrome image recording apparatus but may be a printer capable of recording a full-colored or multicolored image on the sheet M, and the printer 100 may have the tank 220 for each of a plurality of colored inks to be used in the full-color or multicolor image recording.

For another example, the liquid supplying apparatus may not necessarily be limited to the printer 100 but may include a multifunction peripheral machine, a copier, and a facsimile machine. The multifunction peripheral machine may be an apparatus equipped with a plurality of functions among a printing function, a copying function, and a facsimile transmitting/receiving function.

For another example, the printer 100 may have a line-formation printing head in place of the serial-formation printing head 200. In the printer 100 with the line-formation printing head 200, the head 200 may not be conveyed in a scanning direction, e.g., the widthwise direction 9, but may stay still at a position above the platen 180 while ejecting the ink.

For another example, the tank 220 may not necessarily be the on-carriage tank but may be a so-called off-carriage tank, which may not be mounted on the carriage 190 but may be located separately from the carriage 190.

What is claimed is:

1. A liquid supplying apparatus, comprising:

a tank configured to store liquid, the tank having a wall, in which a hole open to outside of the tank is formed;

a reservoir chamber arranged in the tank, the reservoir chamber being configured to store a portion of the liquid in the tank; and a flow path arranged in the tank, the flow path being configured to store another portion of the liquid in the tank, the flow path connecting the reservoir chamber and the hole, wherein, in the tank being in a rotated posture, in which the tank is rotated about an axis extending along a horizontal direction by an angle from a usable posture, in which the liquid is suppliable externally from the tank, the reservoir chamber is configured to create an air layer with a predetermined maximum amount of the liquid storable in the tank, the air layer being enclosed by a surface of the liquid stored in the tank and walls delimiting the reservoir chamber, the walls delimiting the reservoir chamber being different from the wall having the hole therein, a surface of the liquid in the flow path being maintained at a level equal to or lower than a surface of the liquid in the reservoir chamber by a negative pressure produced by the air layer, and in the tank being in the rotated posture, and the angle of rotation being less than or equal to 90°, a lower end of the flow path is located lower than the hole.

2. The liquid supplying apparatus according to claim 1, wherein the flow path has a buffer space capable of storing the liquid in the tank being in the rotated posture.

3. A liquid supplying apparatus, comprising:

a tank configured to store liquid, the tank having a hole open to outside of the tank;

a reservoir chamber arranged in the tank, the reservoir chamber being configured to store a portion of the liquid in the tank; and a flow path arranged in the tank, the flow path being configured to store another portion of the liquid in the tank, the flow path connecting the reservoir chamber and the hole, the flow path being delimited at least by a first wall and a second wall, wherein, in the tank being in a rotated posture, in which the tank is rotated about an axis extending along a horizontal direction by an angle from a usable posture, in which the liquid is suppliable externally from the tank, one of the first wall and the second wall is located above the other of the first wall and the second wall, and the one of the first wall and the second wall extends in one of a direction along the horizontal direction and a direction slanting to be lower along an orientation of a flow toward the reservoir chamber, and in the tank being in the rotated posture, and the angle of rotation being less than or equal to 90°, a lower end of the flow path is located lower than the hole.

4. The liquid supplying apparatus according to claim 3, wherein the flow path has a buffer space capable of storing the liquid in the tank being in the rotated posture.

* * * * *